United States Patent [19]

Apicella, Jr.

[11] 4,156,913

[45] May 29, 1979

[54] METHOD AND APPARATUS FOR CONTROLLING THE THICKNESS OF EXTRUDED STOCK

[75] Inventor: Anthony M. Apicella, Jr., Massillon, Ohio

[73] Assignee: The Goodyear Tire & Rubber Company, Akron, Ohio

[21] Appl. No.: 903,329

[22] Filed: May 5, 1978

Related U.S. Application Data

[63] Continuation-in-part of Ser. No. 726,712, Sep. 24, 1976, Pat. No. 4,088,721.

[51] Int. Cl.² .............................................. G06F 15/46
[52] U.S. Cl. .................................... 364/469; 264/40.4; 264/40.7; 364/473; 364/563; 364/567; 425/141
[58] Field of Search .............. 364/118, 469, 473, 567, 364/563; 264/40.4, 40.7; 425/141, 140, 145

[56] References Cited

U.S. PATENT DOCUMENTS

| | | | |
|---|---|---|---|
| 3,496,344 | 2/1970 | Chope | 364/469 X |
| 3,844,870 | 10/1974 | Donoghue et al. | 364/473 X |
| 3,852,578 | 12/1974 | Rice | 364/469 X |
| 3,875,383 | 4/1975 | Somerville et al. | 364/118 |
| 3,890,078 | 6/1975 | Straumanis | 425/141 |
| 3,930,922 | 1/1976 | Donoghue et al. | 364/118 X |

*Primary Examiner*—Joseph F. Ruggiero
*Attorney, Agent, or Firm*—D. M. Ronyak; L. A. Germain

[57] ABSTRACT

The thickness of a cut length of a continuously extruded elastomer is controlled by sampling the weight of a section of the continuous extrusion at a running-weigh-scale each second; computing one-minute averages of the running-weigh-scale samples and storing "A" to "n" of the averages where "A" is the newest and "n" is the oldest stored average; sampling the extruder motor power draw each second; computing one-minute averages of the power draw and storing "B" to "m" of the averages where "B" is the newest and "m" is the oldest stored average; comparing the newest to the oldest power draw average to obtain a difference between the two and multiplying the difference by a constant indicative of the type of elastomeric material being processed through the extruder to obtain a power-draw deviation signal; sampling the weight of a cut length of material extrusion at a check-weigh-scale; comparing the check-weigh-scale value to the oldest "n" stored running-weigh-scale one-minute average and to the power draw deviation to obtain a targeted running-weigh-scale average; comprising the targeted running-weigh-scale average to the newest "A" stored running-weigh-scale one-minute average to obtain a deviation from the targeted value if one exists; and converting the deviation from the targeted running-weigh-scale value to a control signal for increasing or decreasing the speed of a take-away belt positioned at the extruder exit orifice to vary the thickness of the extrusion in accordance with the deviation control signal and the speed of the belt.

8 Claims, 1 Drawing Figure

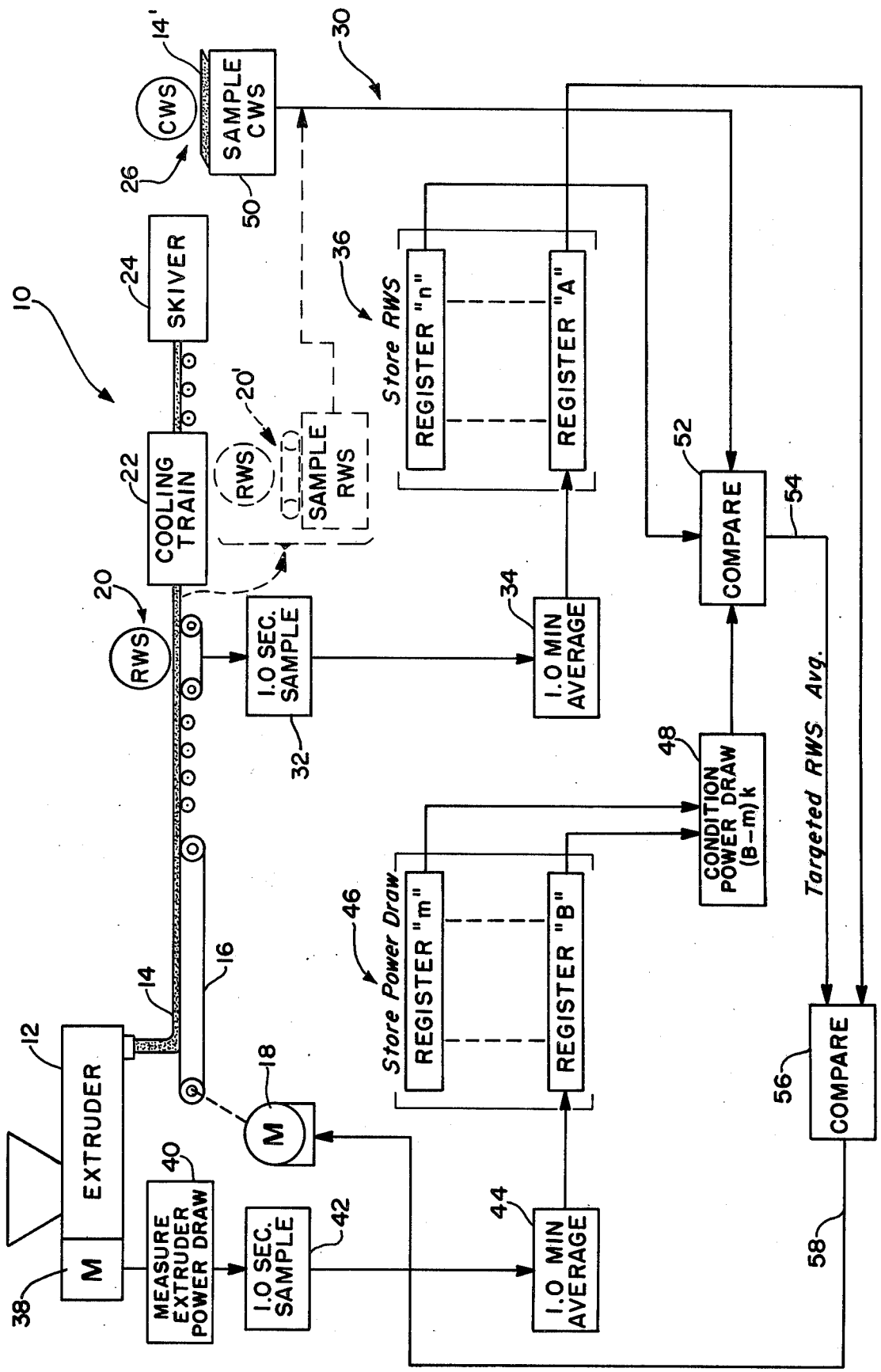

METHOD AND APPARATUS FOR CONTROLLING THE THICKNESS OF EXTRUDED STOCK

BACKGROUND OF THE INVENTION

This is a continuation-in-part of application Ser. No. 726,712, filed Sept. 24, 1976, now issued to U.S. Pat. No. 4,088,721 on May 9, 1978.

This invention generally relates to process control and more specifically to a method and apparatus for accurately and automatically maintaining the cut length thickness of a continuously extruded elastomer that may be applied as tread stock in the manufacture of vehicle tires.

Presently, the elastomeric stock used for tire treads is extruded in a continuous sheet form of the desired width, cooled, and cut to the required length for a particular tire circumference. The thickness of tread stock has heretofore been controlled by an extruder operator monitoring the weight of the extruded material since its weight is directly related to the material thickness.

Monitoring of the extrusion is accomplished manually by an operator comparing the weight of a running length of continuous extrusion as it passes over a running-weigh-scale (hereinafter referred to as the RWS) to the weight of a cut length of the material taken at a check weight scale (hereinafter referred to as the CWS) after the extrusion is cooled and skived. The tread stock specification is established at the CWS with the RWS providing a means for the operator to make a first approximation inasmuch as the RWS and CWS are at separate locations in the process. If, for example, the operator has determined that the weight and thus the thickness of cut tread stock is too high as taken at the CWS, he may vary the speed of a take-away belt positioned at the exit orifice of the extruder. By increasing the belt speed, the extrusion is stretched and therefore a thinner tread stock will result. When the CWS value of tread stock is within specification, the operator again checks the weight value at the RWS that produced the correct tread stock thickness and thereafter attempts to maintain the RWS at this value. Alternately, if the CWS value is too low, indicative of a thinner tread stock, the take-away belt may be slowed down with the result being a thicker extrusion.

Thus, it must be appreciated that the present system of maintaining cut length extrusion thickness is primarily an operator-oriented operation and leaves much to be desired. For example, the operator is limited in the number of checks that may be made and during the time he is "zeroing-in" on the correct RWS weight a length of extrusion will have passed that may have to be scrapped because it is out of specification as determined at the CWS. Further, the accuracy of the adjustments are at most a hit-and-miss proposition being dependent on the operator doing the checks. In addition, changes in the extruded material are continually taking place due to environmental conditions and it is difficult to monitor the material often enough to maintain continual quality of cut tread lengths.

It is therefore an object of this invention to provide an automated control system that is fast and accurate and which is capable of maintaining tread stock thickness within a closer tolerance than heretofore possible.

Another object of the invention is to provide a method and apparatus capable of detecting system malfunctions at an early stage such as to eliminate long lengths of scrap material.

A further object is to ultimately produce tire tread extrusions that exhibit uniformity in thickness and therefore offer increased quality than heretofore possible.

SUMMARY OF THE INVENTION

The above objects and advantages of the invention will become apparent from the detailed description that follows wherein the thickness of a cut length of a continuously extruded elastomer is controlled by sampling the weight of a section of the continuous extrusion at a running-weigh-scale each second; computing one-minute averages of the running-weigh-scale samples and storing "A" to "n" of the averages where "A" is the newest and "n" is the oldest stored average; sampling the extruder motor power draw each second; computing one-minute averages of the power draw and storing "B" to "m" of the averages where "B" is the newest and "m" is the oldest stored average; comparing the newest to the oldest power draw average to obtain a difference between the two and multiplying the difference by a constant indicative of the type of elastomeric material being processed through the extruder to obtain a power-draw deviation signal; sampling the weight of a cut length of material extrusion at a check-weigh-scale; comparing the check-weigh-scale value to the oldest "n" stored running-weigh-scale one-minute average and to the power draw deviation to obtain a targeted running-weigh-scale average; comparing the targeted running-weigh-scale average to the newest "A" stored running-weigh-scale one-minute average to obtain a deviation from the targeted value if one exists; and converting the deviation from the targeted running-weigh-scale value to a control signal for increasing or decreasing the speed of a take-away belt positioned at the extruder exit orifice to vary the thickness of the extrusion in accordance with the deviation control signal and the speed of the belt.

DESCRIPTION OF THE DRAWING

The single drawing is a block flow diagram illustrating the feedback control method comprising the invention.

DESCRIPTION OF THE INVENTION

Referring to the drawing, a process line for extruding elastomeric material is generally indicated by reference numeral 10. The line conventionally comprises an extruder 12 for producing a sheet of elastomeric extrusion 14 that is carried away by a conveyor 16 being driven by a motor 18. The conveyor is generally referred to as a "take-away belt" and its purpose is to control elongation of the extrusion according to the take-away speed of the belt. The extrusion 14 is carried across a running-weigh-scale (RWS) 20 to provide a measure of the weight per unit area of a typical section of the continuous extrusion as it passes thereover. From the RWS the extrusion passes through a cooling train 22 to establish a "set" in the material so that it may be handled further by a skiver 24 that cuts the extrusion into a suitable length for production use. For example, in a tire manufacturing facility the extrusion will be the tread portion of a tire and it is therefore cut to the desired tire circumference. Upon leaving the skiver the cut length tread sections 14' are weighed at a check-weigh-scale (CWS) 26 to make certain that all treads are within a thickness specification since the weight is directly related to the thickness of the extrusion.

Now therefore, according to the instant invention, a control system generally indicated by reference numeral 30 is provided to adjust the take-away belt speed and thus the thickness of the extrusion 14. Accordingly, a sample of the RWS measurement is taken once every second at 32, which sample is an electrical signal indicative of the weight of extrusion on the RWS 20. These one-second samples are averaged each minute at 34 to provide a RWS average weight of material for a specific length on the RWS. The one-minute RWS averages are next stored in separate registers "A" to "n" generally indicated by reference numeral 36. While the "A" register accepts the newest RWS one-minute average, the "n" register stores the oldest RWS average with the number of "n" registers dependent upon the time it takes for the extrusion that was first weighed on the RWS to pass through the cooling train 22 and skiver 24 and ultimately to the CWS 26. For example, if it takes six minutes for the material first weighed at the RWS to reach the CWS, the "n" register is the 6th register and the oldest stored RWS average is six minutes old and corresponds to the extruded material that was sampled on the RWS six minutes ago.

In the same manner the power drawn by the extruder motor 38 is measured by a suitable device 40 such as a wattmeter and sampled once each second at 42, which sample is indicative of the volume characteristic of elastomeric material passing through the extruder 12. Of course, it is recognized that this characteristic also corresponds to the specific length of extruded material 14 being deposited on the belt 16. The one-second samples of the extruder motor power draw are also averaged each minute at 44 and these averages are stored in separate "B" to "m" registers generally indicated by reference numeral 46. While the "B" register accepts the newest power draw one-minute average the "m" register stores the oldest average with the number of such registers dependent upon the time it takes the extrusion 14 to pass through the system to the CWS 26. For example, if it takes seven minutes for the material whose power draw is sampled at the extruder to reach the CWS 26 then the "m" register is the seventh register and oldest stored extruder motor power draw sample is seven minutes old. The newest "B" value of the power draw is then compared at 48 to the oldest or "m" stored value and the difference between the two is conditioned by a constant "k" indicative of the characteristics of the elastomeric material being extruded.

To continue, the CWS is also samples at 50 and the signal indicative of the CWS value is compared at 52 to the oldest stored RWS average in the "n" register and the conditioned power draw signal from 48 to provide a targeted RWS average 54.

The targeted RWS average 54 is next compared at 56 to the newest stored RWS average in the "A" register to provide a deviation control signal 58 if a deviation between the two exists. The deviation control signal is used to control the conveyor drive motor 18 and thus the belt speed to correct the extrusion thickness in accordance with the amount of the deviation.

It will be recognized that in some operations the material 14 may not be skived until ready for use but may be rolled on spools or layered onto skids and stored. In this circumstance, the skiver 24 and check-weigh-scale 26 are eliminated in the line and a second running-weigh-scale 20' (shown in ghost lines) may be installed after the cooling train 22. The RWS 20' will thus be sampled periodically and compared at 52 with the resultant targeted RWS average compared at 56 to the newest stored RWS average in the "A" register and the resultant signal 58 again effectively controlling the extrusion thickness by reason of controlling the take-away belt speed as heretofore described.

The advantages of the above-described system should now be apparent. Firstly, the response time of the system is faster than what could be achieved by an operator-controlled system. Secondly, the system stores past history and because it does, it is able to hold the cut length extrusions to a much tighter tolerance than could be achieved by an operator. Thirdly, the system is able to detect process malfunctions such as feed-strip breaks, etc., in a shorter time, thus eliminating long lengths of scrap material.

While certain representative embodiments and details have been shown for the purpose of illustrating the invention, it will be apparent to those skilled in this art that various changes and modificatiions may be made therein without departing from the spirit or scope of the invention.

We claim:

1. In a process comprising an extruder for providing a continuous sheet length of elastomeric extrusion, a variable speed take-away conveyor belt to vary the thickness of the extrusion as it exits the extruder, a running-weigh-scale to measure the weight per unit area of the continuous extrusion, a cooling train to set the extrusion, a skiver to cut the continuous extrusion into specific lengths, and a check-weigh-scale to measure the cut length weight, a method of controlling the thickness of the cut lengths of extruded elastomer comprising the steps of:
   (a) sampling the weight of the extrusion at the running-weigh-scale each second;
   (b) computing and storing one-minute averages of the running-weigh-scale samples;
   (c) sampling the power draw at the extruder each second;
   (d) computing and storing one-minute averages of the power draw samples;
   (e) conditioning the oldest and newest power draw one-minute averages to obtain a power draw deviation if one exists;
   (f) sampling the weight of the cut lengths of extrusion at the check-weigh-scale;
   (g) comparing the check-weigh-scale value to the oldest stored running-weigh-scale one-minute average and the power draw deviation to obtain a targeted running-weigh-scale average;
   (h) comparing the targeted running-weigh-scale average to the newest stored running-weigh-scale one-minute average to obtain a deviation for the targeted value if one exists; and
   (i) converting the deviation from the targeted running-weigh-scale value to a control signal for increasing or decreasing the speed of the take-away belt to vary the thickness of the extrusion in accordance with the amount of deviation and the take-away speed of the belt.

2. The method as set forth in claim 1 wherein the running-weigh-scale one-minute averages are stored in a series sequence of "A" through "n" registers with the "A" register accepting the newest computed one-minute average while the "n" register stores the oldest one-minute average, the number of "n" registers equal to the amount of time it takes the extrusion to pass from the running-weigh-scale to the check-weigh-scale, and wherein said power draw one-minute averages are stored in a series sequence of "B" through "m" registers with the "B" register accepting the newest computed one-minute average while the "m" register stores the oldest one-minute average, the number of "m" registers equal to the time it takes the extrusion to pass from the extruder exit orifice to the check-weigh-scale.

3. The method as set forth in claim 2 wherein the oldest and newest power draw one-minute averages are compared and the difference between the two is conditioned by a constant "k" indicative of the characteristics of the extruded material.

4. In a process comprising an extruder for providing a continuous sheet length of elastomeric extrusion, a variable speed take-away belt to vary the thickness of the extrusion as it exits the extruder, a running-weigh-scale to measure the weight-per-unit-area of the continuous extrusion, a cooling train to set the extruded material, a skiver to cut the continuous extrusion into specific lengths, and a check-weigh-scale to measure the cut length weight, apparatus for controlling the thickness of the cut lengths of extruded elastomer comprising:

(a) means to sample the weight of the extrusion at the running-weigh-scale each second;
(b) means to compute and store one-minute averages of the running-weigh-scale samples;
(c) means to sample the power draw at the extruder each second;
(d) means to compute and store one-minute averages of the power draw samples;
(e) means to condition the oldest and newest stored power draw one-minute averages to a constant "k" indicative of the characteristic of the extruded material to obtain a power draw deviation if one exists;
(f) means to sample the weight of the cut lengths of extrusion at the check-weigh-scale;
(g) first comparator means to compare the check-weigh-scale samples to the oldest stored running-weigh-scale one-minute average and the power draw deviation to obtain a targeted running-weigh-scale average;
(h) second comparator means to compare the targeted running-weigh-scale average to the newest stored running-weigh-scale one-minute average to obtain a deviation from the targeted value if one exists; and
(i) converting means to convert the deviation from the targeted running-weigh-scale value to a control signal for increasing or decreasing the speed of the take-away belt to vary the thickness of the extrusion on the belt in accordance with the amount of deviation and the take-away speed of the belt.

5. The apparatus as set forth in claim 4 wherein the means to store running-weigh-scale one-minute averages comprises a series sequence of "A" through "n" registers, the "A" register accepting the newest computed running-weigh-scale one-minute average while the "n" register stores the oldest computed one-minute average, the number of "n" registers being equal to the time it takes the extrusion to pass from the running-weigh-scale to the check-weigh-scale, and the means to store the power draw one-minute averages comprises a series sequence of "B" through "m" registers, the "B" register accepting the newest computed power draw one-minute average while the "m" register stores the oldest one-minute average, the number of "m" registers being equal to the time it takes the extrusion to pass from the extruder exit orifice to the check-weigh-scale.

6. The apparatus as set forth in claim 5 wherein the means to condition the oldest and newest stored power draw one minute averages comprises means for computing the difference between the newest power draw average in the "B" register and the oldest power draw average in the "m" register and multiplying the difference by a constant "k" indicative of the characteristic of the material being processed in the extruder.

7. In a process comprising an extruder for providing a continuous sheet length of elastomeric extrusion, a variable speed take-away belt conveyor to vary the thickness of the extrusion as it exits the extruder, a first running-weigh-scale to measure the weight per unit area of the continuous extrusion, a cooling train to set the extrusion, and a second running-weigh-scale to measure the weight per unit area of the cooled extrusion, a method of controlling the thickness of the extruded elastomer comprising the steps of:

(a) sampling the weight of the extrusion at the first running-weigh-scale each second;
(b) computing and storing one-minute averages of the running-weigh-scale samples;
(c) sampling the power draw at the extruder each second;
(d) computing and storing one-minute averages of the power draw samples;
(e) conditioning the oldest and newest power draw one-minute averages to obtain a power draw deviation if one exists;
(f) sampling the weight of the extrusion at the second running-weigh-scale;
(g) comparing the second running-weigh-scale sample to the oldest stored first running-weigh-scale one-minute average and the power draw deviation to obtain a targeted running-weigh-scale average;
(h) comparing the targeted running-weigh-scale average to the newest stored one-minute average from the first running-weigh-scale to obtain a deviation for the targeted value if one exists; and
(i) converting the deviation from the targeted running-weigh-scale value to a control signal for increasing or decreasing the speed of the take-away belt to vary the extrusion thickness in accordance with the amount of deviation and the take-away speed of the belt.

8. In a process comprising an extruder for providing a continuous sheet length of elastomeric extrusion, a variable speed take-away belt conveyor to vary the thickness of the extrusion as it exits the extruder, a first running-weigh-scale to measure the weight per unit area of the continuous extrusion, a cooling train to set the extrusion, and a second running-weigh-scale to measure the weight per unit area of the cooled extrusion, apparatus for controlling the thickness of the extruded elastomer comprising:

(a) means to sample the weight of the extrusion at the first running-weigh-scale each second;
(b) means to compute and store one-minute averages of the first running-weigh-scale samples;
(c) means to sample the power draw at the extruder each second;
(d) means to compute and store one-minute averages of the power draw samples;
(e) means to condition the oldest and newest stored power draw one-minute averages to a constant "k" indicative of the characteristic of the extruded material to obtain a power draw deviation if one exists;

(f) means to periodically sample the weight of the extrusion at the second running-weigh-scale;

(g) first comparator means to compare the second running-weigh-scale sample to the oldest stored first running-weigh-scale one-minute average and the power draw deviation to obtain a targeted running-weigh-scale average;

(h) second comparator means to compare the targeted running-weigh-scale average to the newest stored first running-weigh-scale one-minute average to obtain a deviation for the targeted value if one exists; and (i) means to convert the deviation of the targeted value to a control signal for increasing or decreasing the speed of the take-away belt to vary the extrusion thickness in accordance with the amount of deviation and the take-away speed of the belt.

* * * * *